US005314646A

United States Patent [19]

Strobel et al.

[11] Patent Number: 5,314,646

[45] Date of Patent: May 24, 1994

[54] METHOD FOR THE PRODUCTION OF A CERAMIC MOULDING

[75] Inventors: Klaus Strobel; Karl Schwarzmeier, both of Selb, Fed. Rep. of Germany

[73] Assignee: Hutschenreuther AG, Selb, Fed. Rep. of Germany

[21] Appl. No.: 688,166

[22] Filed: Apr. 19, 1991

[30] Foreign Application Priority Data

Apr. 20, 1990 [DE] Fed. Rep. of Germany ....... 4012700

[51] Int. Cl.[5] ...................... C04B 33/32; C04B 33/34; B28B 7/34

[52] U.S. Cl. .......................................... 264/6; 264/13; 264/60; 264/62; 264/63; 264/66; 264/313; 264/314; 264/570

[58] Field of Search ...................... 264/60, 570, 6, 13, 264/63, 62, 66, 313, 314

[56] References Cited

U.S. PATENT DOCUMENTS

| | | | |
|---|---|---|---|
| Re. 20,460 | 8/1937 | Jeffery . | |
| 1,699,502 | 1/1929 | Crowley . | |
| 3,664,799 | 5/1972 | Wallick, Jr. et al. | 425/389 |
| 3,737,276 | 6/1973 | Hill | 264/316 |
| 4,473,526 | 9/1984 | Bühler | 264/517 |
| 4,482,515 | 11/1984 | Bühler | 264/102 |
| 4,501,714 | 2/1985 | Strobel | 264/245 |
| 4,544,345 | 10/1985 | Buhler et al. | 425/405 R |
| 4,560,336 | 12/1985 | Buhler et al. | 425/78 |
| 4,588,368 | 5/1986 | Bühler | 425/546 |
| 4,788,023 | 11/1988 | Buhler et al. | 264/517 |

FOREIGN PATENT DOCUMENTS

| | | | |
|---|---|---|---|
| 0176266 | 4/1986 | European Pat. Off. . | |
| 2939134 | 4/1980 | Fed. Rep. of Germany . | |
| 3128347A1 | 2/1983 | Fed. Rep. of Germany . | |
| 3144678A1 | 5/1983 | Fed. Rep. of Germany . | |
| 3207565A1 | 9/1983 | Fed. Rep. of Germany . | |
| 3101236C2 | 12/1984 | Fed. Rep. of Germany . | |
| 3341959C1 | 4/1985 | Fed. Rep. of Germany . | |
| 3339487A1 | 5/1985 | Fed. Rep. of Germany . | |
| 3517494A1 | 11/1986 | Fed. Rep. of Germany . | |
| 3734876A1 | 4/1989 | Fed. Rep. of Germany . | |
| 3807853C1 | 8/1989 | Fed. Rep. of Germany . | |
| 3823393C1 | 1/1990 | Fed. Rep. of Germany . | |
| 3128348C2 | 2/1990 | Fed. Rep. of Germany . | |
| 57-146607 | 9/1982 | Japan | 264/570 |
| 62-273809 | 11/1987 | Japan | 264/570 |
| 63-236605 | 10/1988 | Japan | 264/570 |
| 1496847 | 1/1978 | United Kingdom . | |
| 2177649 | 1/1987 | United Kingdom . | |
| 2219549 | 12/1989 | United Kingdom . | |

OTHER PUBLICATIONS

"A Review of the Slip Casting Process" by R. R. Rowlands, *Ceramic Bulletin,* vol. 45, No. 1 (1966), pp. 16–19.

"Gasdrucksintern mit kontrollierter Verdichtung" by H. U. Kessel and W. P. Engel, cfi/Ber. DKG 66 (1989) No. 5/6, pp. 227–234.

*Primary Examiner*—James Derrington
*Attorney, Agent, or Firm*—Brumbaugh, Graves, Donohue & Raymond

[57] ABSTRACT

According to one example of embodiment of the invention a ceramic pre-moulding 81 of stable form is pressed from ceramic composition in powder form in a first isostatic pressing action, at least a part of its surface being formed in contact with rigid shaping surfaces 42. The pre-moulding 81 thus obtained is then—possibly after glazing-subjected to a higher pressure, in a further pressing operation on all sides and then fired in a ONCE-ONLY quick-firing method.

34 Claims, 6 Drawing Sheets

METHOD FOR THE PRODUCTION OF A CERAMIC MOULDING

BACKGROUND OF THE INVENTION

The invention relates to a method for the production of a ceramic moulded body by moulding of a ceramic moulding composition into a moulding of stable form, and subsequent firing of a moulding.

When there is mention here of ceramic moulding compositions, the term "ceramic moulding composition" is to be understood in the widest sense. It includes all fine ceramic and coarse ceramic moulding compositions, such as stoneware, crockery, vitreous china, bone china and especially porcelain, also industrial ceramic compositions, for example on the basis of silicon carbide, silicon nitride, aluminium oxide and zirconium oxide.

When there is mention here of ceramic moulding, this term too is to be understood in the widest sense independently of the shaping, but especially one has in mind thin-shelled moulded bodies such as occur as table crockery parts in the form of plates, dishes, bowls and jugs. The invention has special importance for the production of plates, dishes and bowls, which conventionally can be produced by pressing of ceramic moulding compositions in powder form, for example from granulated porcelain grain. Fundamentally the invention is applicable to the processing of all industrial dusts, even those of powder metallurgy.

STATEMENT OF THE PRIOR ART

For the production of ceramic moulded bodies what is called isostatic pressing is known. Reference is made by way of example to DE-PS 3,101,236, DE-OS 3,128,347 and DE-PS 3,128,348. In all these cases ceramic moulding composition in powder form is subjected to its final pressing into the moulding, preceding the firing, in that this moulding composition is charged into a mould cavity which is partially lined with a diaphragm, and after the charging of the ceramic composition in powder form into the mould cavity the composition is pressed, by exertion of hydrostatic pressure upon the rear of the diaphragm, against a rigid mould surface which forms, so to speak, the reference surface for the pressing operation and imposes its form exactly upon the moulding in its optically or technically most important surface regions.

From U.S. Pat. No. 3,664,799 it is further known to press a toilet pan lined with diaphragms lying opposite to one another, in a mould cavity, while fluid pressure is applied at the same time on the rear of both diaphragms. In this case the optically and technically most important surface regions are again in abutment with rigid mould surfaces which are not lined by the diaphragms.

It is also known from U.S. Pat. No. Re. 20,460 to press ceramic mould parts isostatically. Here in the case of the production of a solid spherical moulded body an isostatic press diaphragm is known which covers a large part of the surface. However even here the moulding lies during the pressing operation with a residual region of its surface against a rigid shaping surface under application pressure. It is also not possible here to distinguish between a pre-moulding and a moulding, because the final moulding is produced in a single pressing operation.

In so far as this U.S. Pat. No. Re. 20,460 is concerned with the production of flat moulded parts such as bowls or plates, it conforms with the proposals of the patent specifications mentioned above is as much as the moulded parts again experience their final pressing between a diaphragm and a rigid mould surface.

The pressures which have hitherto been applied for the isostatic pressing of tableware parts in the ceramic industry lie in the order of magnitude of 200 to 300 bars.

One large problem which has hitherto always arisen in the ceramic industry, irrespective of in whichever manner the moulding to be fired has been produced, lies in the shrinkage of the moulding and in the deformation of the moulding in firing.

OBJECT OF THE INVENTION

The invention is based upon the problem of producing ceramic moulded bodies with the most exact surface configuration possible and especially of reducing the shrinkage and the deformation phenomena occurring due to the shrinkage, in firing.

SUMMARY OF THE INVENTION

To solve this problem it is proposed in accordance with the invention that the moulding composition, in a shaping operation, is moulded out in contact with at least one substantially rigid shaping surface into a pre-moulding of stable form geometrically similar to the moulded body to be obtained, and that this pre-moulding is pressed in a protective skin system of neutral shaping enclosing it on all sides, without pressing against rigid shaping surfaces, by pressing on all sides by means of a pressing fluid acting upon the outside of the protective skin system, with volume reduction, the geometrical similarity with the moulding being simultaneously preserved.

When in the definition of the method according to the invention there is mention of a "pre-moulding of stable form", this means that the pre-moulding is not influenced in its surface form by any further handling and processing measures attributed to it and the pressing on all sides, that is it retains its geometric similarity.

When with regard to the protective skin system it is said that it should be neutral in shaping, that means that the existence of the protective skin system should have no influence of any kind upon the surface configuration of the moulding, that is the pressure distribution issuing from the pressing fluid upon the surface of the moulding should thus be such as if the protective skin system were not present there at all. This shaping neutrality is achieved by appropriately thin, smooth and flat protective skin materials, and the skin thickness to be used in each case depends naturally upon the protective skin material in each case and the use in each case.

Surprisingly it has appeared that when using the method according to the invention one obtains a far more exact surface form of the ceramic moulded bodies after firing than in the case of the methods used hitherto. This is surprising in as much as one dispenses with the shaping by abutment on rigid mould surfaces, in the final pressing of the moulding to be subjected to the firing operation. It has appeared that in the case of a pressure action of a pressing fluid on all sides upon the previously formed pre-moulding, the exactness of the surface configuration of the pre-moulding is not impaired. The pre-moulding experiences a geometrically similar volume compression, but remains as exact in its surface configuration as it was produced previously in contact with rigid shaping faces; for example: a plane face surprisingly remains a plane face. On the other hand the shrinkage in the subsequent firing is reduced and the amount of deformation occurring in firing is substantially reduced in comparison with the previously known methods. While in the firing of mouldings produced according to known methods, such as dishes or plates, for example one had to expect a bulging of unsupported faces within the standing area, and endeavoured to compensate these bulges by appropriate forming-out of the moulding, such deformation phenomena occur only to a very much slighter extent—if at all—in the production of moulded bodies according to the method in accordance with the invention.

It was a further problem in production methods hitherto that the produced moulded bodies were subjected to different extents to firing shrinkage, so that dishes which ought to be of the same size in fact turned out with different diameters and different heights. When the method according to the invention is used, with the firing shrinkage the width of variation of the dimensions of ceramic bodies produced in equal moulds is also reduced correspondingly. The fluctuations of moulded body sizes occurring hitherto from firing to firing likewise become less with the method according to the invention, without the regularity of the firing conditions being modified.

Furthermore it has, appeared that the surface structure of the fired moulded bodies is improved. More especially, smooth surfaces become smoother than hitherto and free from pinholes and other structures.

In the case of moulded bodies with thin-shelled edges the edge impact strength, which is of great importance especially in tableware parts for household and catering trade, is an old problem. It has appeared that this edge impact strength is substantially improved when the method according to the invention is used. Thus for example it was ascertained that the edge impact strength of plates produced according to the invention under a pressure of 1,000 bars lies higher by the factor 2 than the edge impact strength of otherwise identical plates which have been produced in the usual isostatic pressing method, somewhat according to DE-PS 3,101,236.

The problem of obtaining flat standing surfaces of tableware parts, preventing wobbling of the tableware parts on the table, is likewise largely solved with the type of production according to the invention.

A further advantage of the method according to the invention resides in that the mouldings, thanks to the pressure imparted to them on all sides in introduction into a firing kilo, already possess considerably smaller dimensions, namely in all directions, that with the manner of production of the mouldings as hitherto. By way of example, using a pressure of 1,000 bars to a flat plate which was previously moulded by the isostatic pressing method in the conventional manner at 250 bars, one can obtain a diameter reduction of 6%. This corresponds to a reduction of the firing shrinkage by about 50%; one example: If hitherto the reduction of the diameter by firing shrinkage amounted to 12%, this firing shrinkage reduction is now reduced to 6%. Thus a more effective exploitation of the expensive firing chamber is guaranteed.

Very good results of the method according to the invention have been ascertained with pressures of ≧350 bars, ≧400 bars, ≧500 bars, ≧750 bars and ≧1,000 bars. It has here appeared that on further increase beyond 1,000 bars, the result is not improved substantially further, or at least the improvement is no longer in the same proportion to the expense as in the lower pressure ranges.

In detail, the pressures to be applied also depend upon how the pre-moulding has been produced, that is perhaps by isostatic pressing, quasi-isostatic pressing, static pressing, clay casting, injection moulding and potter's wheel throwing. The above-mentioned values are valid especially for the case where the pre-mouldings were obtained by isostatic pressing.

In order to ensure that the volume compression on all sides occurring in pressing on all sides is maintained on relaxation of the pressure, it is provided, especially in the case of porcelain compositions, that the pressing on all sides takes place while the pre-moulding contains water. The water content in pressing on all sides can here amount to between app. 2% wt. and about 15% wt. and preferably amounts to app. 3.5% wt. to app. 10% wt. The maintenance of the volume compression after elimination of the pressure can also be effected in that the pre-moulding receives during the pressing on all sides a high molecular organic binding agent, for example carboxy methyl cellulose or a liquid synthetic plastic material.

The presence of the above-stated contents of water and/or high molecular organic binding agents, especially in porcelain compositions, is also desired as early as during the production of the pre-moulding, especially if the pre-moulding is produced from dry granulate.

In so far as water or organic binding agent should be present in the pre-moulding in the secondary pressing, the water or organic binding agent, as the case may be can be left over in each case from the pre-moulding. If a lengthy storage period is interposed between the formation of the pre-moulding and the secondary pressing on all sides, and during this storage period the water present from the pre-moulding can escape by evaporation, then it is also conceivable to impart an addition of water afresh before the secondary pressing of the pre-moulding to be pressed again. By way of example this water addition can also take place by application of a water-containing glaze, if it is intended to apply a glaze before the secondary pressing. As liquid synthetic plastics material the liquid synthetic plastics material obtainable under the trade name "Vienapas" comes especially into consideration.

The production of the moulding of stable form is not confined to the production methods identified above by references to literature. In principle in all known production methods an improvement is achievable for the pre-moulding by the subsequent application of the method according to the invention. More especially, the application of the method according to the invention is of advantage when the pre-moulding to be subjected later to the pressure on all sides has been moulded in a mould cavity with at least partial surface contact with rigid shaping surfaces and thus has received an exact form in the optically and technically most important surface regions.

The method according to the invention can necessitate that the pre-moulding, after its shaping by rigid shaping surfaces, must be at least partially parted from these surfaces, in order in order to be able to be provided with the protective skin. This is an essential difference from the previously identified known method of isostatic pressing, in which the shaping takes place until readiness for firing, in contact with the isostatic diaphragm, and in the end phase of pressing a rigid shaping surface is still in abutment on the moulding being produced.

The application of the method according to the invention is especially advantageous when the shaping of the pre-moulding of stable form took place in surface contact with rigid shaping surfaces, using moulding composition in powder form and with pressure against the rigid shaping surfaces, as is the case not only in the isostatic pressing method of conventional type, but also in pressing methods such as according to DE-OS 3,144,678 or according to DE-OS 3,339,487. When it is ascertained that the shaping operation of the pre-moulding takes place in contact with at least one substantially rigid shaping surface, this should also include the possibility that the shaping surface is formed by an elastic diaphragm, provided that this elastic diaphragm is supported by a rigid support surface.

It has appeared that when the method according to the invention is used on pre-mouldings which—no matter how—have been pressed from ceramic composition in powder form, for example from spray-dried porcelain grain. The quality of the moulded bodies is substantially improved by the use of the method according to the invention and reaches, if not exceeds, a level which corresponds to the quality level of moulded bodies produced by the clay casting method, the injection-moulding method or the rolling process, while it should be remarked that hitherto the ceramic moulded bodies pressed from powder, did not after firing always reach the quality level, in their constancy of shape, edge impact strength and surface structure, of the moulded bodies produced according to the stated methods.

If the pre-moulding is pressed from fluid ceramic composition, for example by the isostatic pressing method with substantially uniaxial pressing direction, then it is recommended to raise the pressure to be used in the preceding pressing on all sides, above that pressure which was used in the preceding isostatic pressing of the pre-moulding. If for example for obtaining the pre-moulding to be pressed subsequently on all sides, in an isostatic pressing method, one uses a pressure of app. 100 bars to 300 bars, then one is right with the above-stated values of 350 bars to 1,200 bars. It is however to be noted that considerable advantages can even already be gained with the method according to the invention, if the isostatic pressing on all sides following upon the shaping of the pre-moulding is carried out with substantially equal pressures, which were previously applied in the isostatic uniaxial pressing. This is explicable in that then a volume compression takes place in any case in those directions in which pressing did not take place previously, that is especially in a radial direction.

It is also to be expressly included in the method according to the invention if the pre-moulding is produced by pouring of a fluid clay into a hollow mould formed by liquid-absorbing shaping parts and subsequent withdrawal of liquid from the clay by the shaping parts. The mouldings produced according to this conventional method are only rarely of unsatisfactory quality if the method is carried out carefully. Likewise it has appeared that by the use of the pressing on all sides on pre-mouldings produced in such manner still further improvements of quality or—in other words—constant quality with less careful conducting of the process are achieved.

Finally the method according to the invention is usable even when the pre-moulding of stable form is moulded according to another conventional method from a plastic moulding composition (rolling method or potter's wheel).

Of whatever nature the protective skin system is, it is advisable to evacuate the space containing the pre-moulding enclosed by the protective skin, before the pressing on all sides, so that an air volume contained in the protective skin cannot lead in the pressing or expansion to the destruction of the pre-moulding or moulding.

It has appeared that the pre-moulding can be printed with a decoration before the pressing on all sides, possibly even in the formation of the pre-moulding (see for example DE-OS 3,207,565), without the decoration being damaged or distorted by the pressing on all sides. The application of decoration to the pre-moulding can here take place after the formation of the pre-moulding, but also during the formation of the pre-moulding. The latter method is known from DE-OS 3,207,565, to which reference is made regarding details. For now only the following should be said: In the isostatic pressing of the pre-moulding between a lower mould half with isostatic diaphragms and an upper shaping half with rigid shaping surface, the rigid shaping surface is provided with the decoration for application, possibly with compensating distortion, and then is transferred on to the occurring pre-moulding, in the pressing of a measured ceramic powder quantity introduced between the diaphragm and the rigid shaping surface.

However the method according to the invention is usable even when the shaped body is decorated after the isostatic pressing on all sides, before firing or possibly after a first firing.

The following is especially surprising: It has been ascertained that in the case of use of the method according to the invention and of application of a glaze, perhaps by spraying or dipping, to the pre-moulding, before its pressing on all sides, outstanding glazing properties are to be observed on the fired moulded body after this, with the glaze, has been fired in a ONCE-ONLY quick-firing process. The glaze properties here obtained are substantially better than the glaze properties which are achieved when for comparison one glazes a moulding, produced according to the isostatic pressing method, such as that of DE-OS 3,128,347, before firing and then subjects it to a ONCE-ONLY quick-firing process. The quality improvement consists especially in that with the method in accordance with the invention, with the glaze application before the pressing on all sides, a moulded body is obtained with a glaze which is completely uniform to the naked eye. This in contrast to a method in which the glaze is applied to a moulding produced by the conventional isostatic pressing such as that according to DE-OS 3,128,347, before the ONCE-ONLY quick-firing process; in the case of this latter method the glaze displays occasional pores and "snake skin structure".

The glaze composition can be applied, using the method according to the invention, after the formation of the pre-moulding of stable form, for example by spraying. In this case stability of form means that the pre-moulding must be at least of such firm structure that it withstands the spraying and the handling actions involved therein, without deformation and without destruction.

Regarding the concept of the ONCE-ONLY quick-firing method it should be said that in this the moulding is subjected during a firing time of about 6–8 hours in all firstly during a temperature rise phase of about 3–4 hours to a temperature rising from about 450° C. to about 1,450° C., then during a temperature retaining phase of about 1 hour to an approximately constant temperature of about 1,450° C. and then during a temperature reduction phase of about 2½ hours to a temperature dropping from about 1,450° C. to about 100° C. This is a typical temperature profile, such as can be used for example when using a porcelain composition on the basis of 58% kaolin,
23% quartz,
19% feldspar, and when using a glaze composition of 4% kaolin,
27% quartz,
29% pegmatite,
23% kaolin fireclay,
14% dolomite,
3% calcite while modifications may occur in the case of other formulations. The temperature fall in the temperature reduction, which may possess a plateau in the middle region of the fall phase, is typical for the ONCE-ONLY quick-firing method.

It is worthy of remark that when using the method according to the invention in combination with the glaze application before the pressing on all sides, it is possible to obtain glazed and possibly also decorated ceramic bodies with the highest structure and surface qualities, in one single quick firing.

The forming of the protective skin can be effected in various ways, for example in that the pre-moulding is inserted into a bag of foil material, especially flat synthetic plastics foil, closed on all sides and forming the protective skin system. Here for reasons of the close-fitting adaptation properties a bag of elastomer foil, for example rubber foil or synthetic rubber foil, is advantageous. Fold formations, leading to impressions in the pre-moulding, are here excluded. However surprisingly it has appeared that even when less elastic foils are used, for example synthetic plastics foils on a basis of polyethylene, polypropylene, polyamide or polyester, good to very good results can be achieved even if fold formations occur. This result is surprising and can possibly be explained in that under the very high pressures applied a cold flow of the foils occurs, leading to suppression of structures caused by folding, provided the pre-moulding is sufficiently "shape stable", possibly by prior isostatic pressing at 200–250 bars.

The bags can be closed by welding or vulcanisation, and it is advisable, for the above-stated reasons, to evacuate the bag enclosing the pre-moulding, before welding. Conventional foil packaging machines, for example those from the foodstuffs industry, are available for the enclosure of the pre-mouldings in foil bags, so that due to this additional operation the advantages of the method according to the invention as a whole are not substantially narrowed. It should be mentioned that shrinking of the foil bags can also be utilised.

Packing in the foil bag will be used especially when it is a matter of what are called flat crockery parts, that is plates, bowls and dishes. If on the other hand hollow crockery articles, such as jugs, are to be subjected to the method according to the invention, then it is simpler to form the protective skin by application on all sides of a coating composition of the pre-moulding; in this case the requirement for evacuation of the interior space of the protective skin can for example be fulfilled in that the application of the coating composition to the pre-moulding takes place in the evacuated chamber.

Various coating compositions come into question, provided only that the shaping neutrality and the seal quality required in each case are guaranteed. Thus the protective skin can be formed from a thermoplasticised mass, such as wax. It is however also possible that the protective skin is formed from a solution or suspension of a film-forming composition, the solvent or suspension means, after application of a liquid coating of the solution or suspension, being expelled from this liquid coating, or that for the formation of the protective skin a liquid composition hardenable by chemical reaction is applied to the pre-moulding and hardened after application.

The application of the pressure on all sides can take place in the simplest manner in that the pre-moulding enclosed by the protective skin system is introduced into a pressure vessel, this pressure vessel is closed and a fluid contained in the pressure vessel is set under pressure. Here it is also possible for several pre-mouldings to be put into the pressure vessel and even stacked directly upon one another, so long as the inherent weight of the pre-mouldings on top of the stack does not lead to a deformation of the pre-mouldings in the under part of the stack. It has in fact appeared that with the very high pressures coming into use the charging on all sides is guaranteed even when the respective pre-moulding in each case stands on a rigid support face or is loaded by further pre-mouldings on the top of the stack. Support on a support surface is not understood as "pressing against rigid abutment faces" within the meaning of the invention.

Another manner of execution of the method according to the invention which is preferred above all in automated procedures consists in that the pre-moulding is inserted between two diaphragms forming the protective skin and then the diaphragms are each subjected to the pressure fluid on their side remote from the pre-moulding. Here again the diaphragms can be produced from flat foils of synthetic plastics material or elastomer material. The use of elastomer foils, especially rubber and synthetic rubber foils, merits preference.

A method variant which especially protects the pre-moulding consists in that at least one of the diaphragms is packed, on its side remote from the pre-moulding, with a support composition which forms a support face, approximately following the surface profile of the moulding, for the pre-moulding before the commencement of the pressing on all sides. Here the diaphragm concerned, before the laying on of the pre-moulding, can be sucked by vacuum against the support face, so that the optimum positioning of the moulding can be found simply.

A foam material composition can be used for example as support composition. It should be remarked that the support composition also should not come into contact with the pre-moulding surface, in pressing on all sides. Rather this contact is eliminated in the application of the pressure fluid concerned.

It is advisable to evacuate the interspace between the diaphragms before the charging of the diaphragms with pressure fluid, namely to such extent that as far as possible all air residues are withdrawn from the structure of the pre-moulding.

The invention further provides a method for the production of mouldings in a manner in which the ceramic moulding composition is pressed into a pre-moulding between two rigid shaping faces, each lined with a diaphragm, in that pressure fluid is brought to act on the side remote from the moulding composition of only one first diaphragm pertaining to a first rigid mould surface, and thus the mould composition is pressed against the second diaphragm rigidly supported on the second rigid mould surface, and in that then, with simultaneous distancing or after distancing has been effected of the second rigid mould surface from the pre-moulding, both diaphragms completely enclosing the pre-moulding are simultaneously charged on all sides with fluid pressure in such a way that the pre-moulding enclosed between the two diaphragms is pressed into the moulding, without contact with rigid mould surfaces. This method variant shows that the method according to the invention is not fundamentally tied to taking the produced pre-moulding completely out of the mould cavity in which it was produced, in order to subject it next to pressing on all sides; rather it is sufficient to eliminate the contact of the pre-moulding with the rigid shaping surfaces.

As pressing fluid there fundamentally come into question pressure fluids, especially water and compressed gases. One works preferably with pressure fluid.

The protective skin must be adapted to the medium in each case in conformity with the requirement for sealing.

The method according to the invention is usable with special preference for the production of thin-shelled moulded bodies in which the edge impact strength plays a special part. Specifically in such thin-shelled moulded bodies the quality improvement achieved in comparison with conventional hydrostatic pressing was not to be expected.

The invention further relates to equipment for the pressing of a ceramic moulding.

According to a first alternative such an apparatus is characterised by a pressure container provided with a detachable lid part, for the reception of at least one pre-moulding provided with a protective skin, and a pressure booster connected to the interior of the pressure container, for placing a fluid contained in the pressure container under pressure.

According to a second alternative which is intended especially for automatic procedures, the apparatus consists of at least, and preferably, two pressure pots each with a cavity and a sealing edge surface enclosing the cavity in each case. The sealing edge surfaces are placed facing one another and covered each with a diaphragm covering over the relevant cavity. The pressure pots are pressable with their sealing edge faces against one another, clamping in the two diaphragms, by a presser device, so that the respective pre-moulding is enclosed between the side faces, facing one another, of the diaphragms, within the sealing edge faces. Thus the foils lie on all sides against the pre-moulding, even where the diaphragms lie against one another, in any case from the moment onwards when the presser fluid is applied by appropriate pressure boosters. For the sucking away of the air from the interspace between the two diaphragms a suction device should be provided.

In order to accelerate the working cadence it is essential that as little presser fluid as possible has to be moved in each pressing action. For this reason it is advisable to provide in at least one of the cavities a support composition which may also be effective only as volume displacer composition and may be fluid-permeable. If it is desired to evacuate the cavities before the introduction of the pre-moulding, in order to suck each pre-moulding against a support face, the cavity in each case will be provided with an air extraction system.

A further alternative for an apparatus according to the invention is characterised by at least two co-operating moulding tools with mutually facing rigid mould faces forming a mould cavity, a diaphragm each abutting on the two rigid mould faces, a clamping device for clamping in diaphragm edges of the two diaphragms in the region surrounding the rigid mould faces, a fluid supply in each case to the side of the two diaphragms remote from the mould cavity, a fluid inflow control system which selectively permits the charging of one or both diaphragms, and a setting device for varying the distance between the two mould faces while maintaining the clamping of the diaphragm edges.

This apparatus too is very suitable for automatic procedures. The charging of the mould composition can fundamentally be effected, in such an apparatus, by vacuum application, in that a vacuum is applied perhaps at a first circumferential point between the two diaphragms, and the porcelain granulate is supplied at another circumferential point. In this case it is necessary, or at any rate expedient, to apply vacuum in the filling operation to the back of the two diaphragms, so that these do not collapse under the internal vacuum in the mould cavity.

BRIEF DESCRIPTION OF THE DRAWINGS

The accompanying Figures explain the invention by means of examples of embodiment, wherein.

DETAILED DESCRIPTION OF THE PREFERRED EMBODIMENTS

Figure 1:
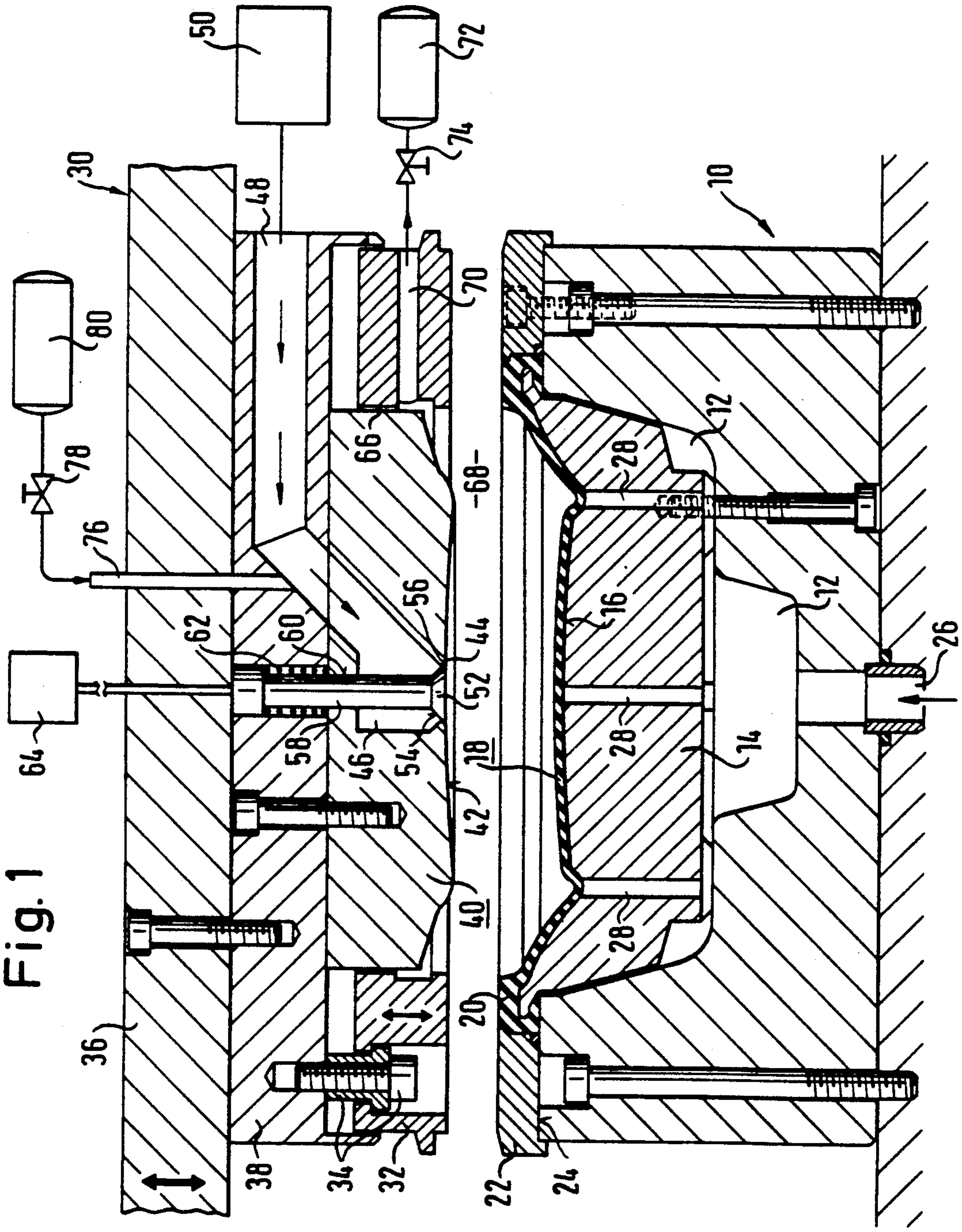
FIG. 1 shows an apparatus for the production of a pre-moulding for use in the method according to the invention.

In FIG. 1 an isostatic pressure pot is designated by 10. In this isostatic pressure pot 10 a pressure chamber is formed which is designated by 12. A support plate 14 is immovably inserted into the pressure chamber 12. The support plate 14 comprises on its upper side a mould face 16. On this mould face 16 there lies a press diaphragm 18 of an elastically deformable material, which fits closely to the mould face 16. The profile edge 20 of the press diaphragm 18 grasps around the edge of the support plate 14 and is made fast by a securing ring 22 on the upper edge 24 of the pressure pot 10. To the pressure chamber 12 there is connected a hydraulic high-pressure conduit 26, through which a high-pressure fluid, for example hydraulic oil, can be admitted into the pressure chamber 12. The pressure of this high-pressure fluid is distributed through bores 28 of the support plate 14 over the under side of the press diaphragm 18, in order to be able to press this upwards in the isostatic pressing.

The isostatic pressing tool 10 co-operates with a shooting head arranged above it, which is designated quite generally by 30. On this shooting head 30, namely on an intermediate plate 38 which is firmly connected with a pressure plate 36. A closure ring 32 is axially movably suspended, which is fixed at its maximum distance from the intermediate plate 38 by bolt-sleeve combinations 34. Within the closure ring 32 a mould plunger 40 is fitted on the intermediate plate 38, the under side of which plunger forms a rigid mould face 42. The mould face 42 is intersected by a composition feed opening 44 which forms the lower exit of an annular chamber 46 formed in the mould plunger 40. The annular chamber 46 is connected to a composition feed conduit 48 running laterally on to it, which conduit runs through the mould plunger 40 and the intermediate plate 38 to a composition reservoir 50. The composition feed opening 44 has associated with it a downwardly conically widened closure piece 52 which is supported with its support face 54 on a counter-support face 56, when the closure piece 52 is situated in the closure position as illustrated in FIG. 1. The under side of the closure piece 52 then lies flush with the mould face 42 of the mould plunger 40.

The closure piece 52 is provided with a shank 58 which is guided in a bore 60 of the mould plunger 40 and the intermediate plate 38 and is initially stressed upwards, that is into the closure position, by a helical compression spring 62. The closure piece 52 can be transferred downwards into the open position by a control appliance 64. The control appliance 64 works in the cadence of the machine.

Between the mould plunger 40 and the closure ring 32 an annular gap 66 is defined which opens into the shooting chamber 68 defined between the mould face 42 and the press diaphragm 18. The annular gap 66 is connected to a suction conduit 70 extending through the closure ring 32 and leading to a suction generator 72. A valve controlled in machine cadence lies in the conduit 70.

A fluidising air conduit 76, which is connected through a valve 78 controlled in machine cadence to atmosphere or a pressure reservoir 80, is connected to the composition feed conduit 48. With the apparatus as described so far the method for the production of a moulding is carried out as follows:

Firstly the shooting head 30 is situated in the lifted-off position as illustrated in FIG. 1, but out of alignment with the pressure pot 10, so that a decoration can be transferred on to the rigid shaping face 42 by means of an elastic decoration transfer face. After application of the decoration to the rigid shaping face 42, the shooting head 30 is brought into alignment with the pressure pot 10. Then the shooting head 30 is lowered under machine cadence control on to the isostatic pressing tool 10. In that action firstly the closure ring 32 lays itself upon the profile edge 20 of the press diaphragm 18 and the securing ring 22. In the further course of the lowering of the shooting head 30 then the closure ring 32 lays itself against the intermediate plate 38 and finally the shaping face 42 comes into its lower end position. The pressure acting upon the pressure plate 30 is firstly transferred alone by way of the closure ring 32 on to the retaining ring 22. The shooting chamber 68 is now closed. Now by opening of the valve 74 negative pressure is applied to the shooting chamber 68 and it is also possible to begin with the application of the negative pressure even during the lowering operation of the shooting head 30. Before the beginning of the negative pressure application to the shooting chamber 68 negative pressure is likewise applied to the under side of the isostatic diaphragm 18, through the conduit 26, so that the isostatic diaphragm 18 remains in contact with the face 16. After the build up of a negative pressure in the shooting chamber 68, or even as early as during the build-up of the negative pressure the closure piece 52 is shifted downwards into its open position by the control appliance 64. Now ceramic moulding composition in powder form can be sucked by the negative pressure in the shooting chamber 68 out of the moulding composition holder 50. Spray-dried porcelain composition of granulate form comes into question especially as moulding composition. Sucking takes place in a manner in which at the beginning of the filling of the shooting chamber 68 no compressed accumulations of moulding composition occur at the mouth of the annular gap 66 into the shooting chamber 68 which could obstruct the further sucking away of air. The moulding composition entering the shooting chamber 68 is so fluidised by the fluidising air which is supplied through the conduit 76, that a uniform distribution results in the whole shooting chamber, in the sense that the spectrum of the granulate grain size is approximately the same at every location within the shooting chamber.

After the termination of filling of the shooting chamber 68 the closure piece 52 is lifted into the closure position and lays itself with the support face 54 against the counter-support face 56, so that the mould face 42 goes smoothly through by way of the mould composition feed opening 44. The vacuum applied to the shooting chamber 68 is however then maintained.

Thereupon the high-pressure fluid is admitted at 26, so that the press diaphragm 18 is lifted and the mould composition is pressed under a pressure of app. 300 bars. Since a negative pressure has prevailed in the shooting chamber 68 since the beginning of introduction of the mould composition into the shooting chamber, there is no danger of inclusion of air cavities in the moulding produced.

After the termination of the isostatic pressing operation the shooting chamber 68 is separated from the negative pressure suction device. Now the shooting head 30 can be lifted again and pivoted away laterally, so that the finally pressed pre-moulding can now be taken out of the isostatic pressing tool 10 and supplied for its further processing, while again a decoration can be impressed upon the rigid shaping face 42. Alternatively the production of the pre-moulding can also be effected according to the method and device according to DE-OS 3,144,678.

Figure 2:
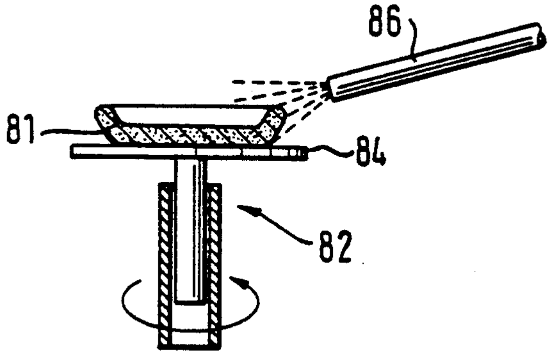
FIG. 2 shows an apparatus for glazing the pre-moulding.
Figure 3:
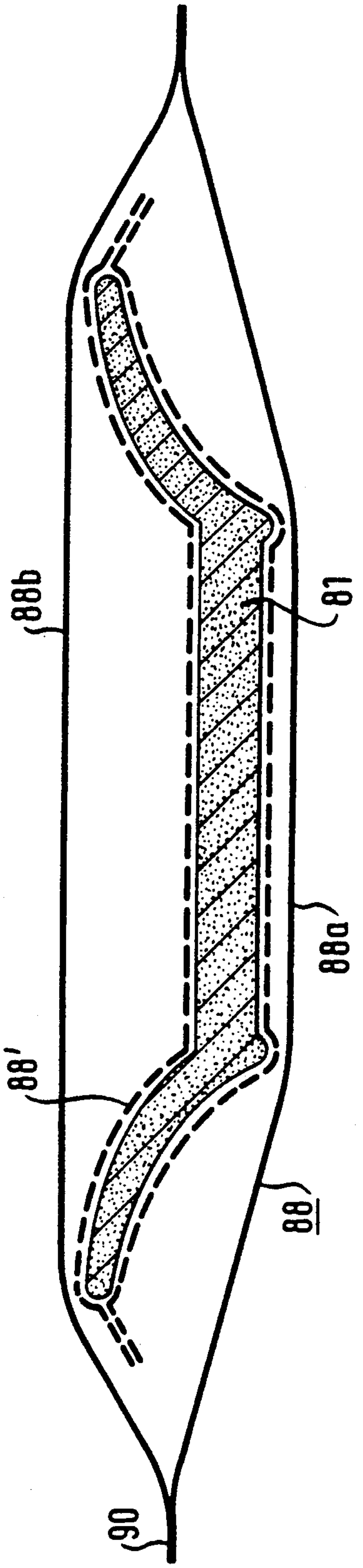
FIG. 3 shows a pre-moulding in a protective skin.

The pre-moulding 81 of stable shape thus formed is now put, as illustrated in FIG. 2, into a glaze application device 82. It is then set on a turntable 84 and sprayed in rotation by a glazing nozzle 86. After drying of the glaze the pre-moulding 81 is inserted, as illustrated in FIG. 3, into a foil bag 88, consisting of two flat foils 88*a* and 88*b*, whereupon the foil bag is welded along one edge 90. The welding takes place in a negative pressure chamber (not shown) so that the interior space of the bag is evacuated and also any air inclusions in the pre-moulding are withdrawn. After cessation of the vacuum the foil bag 88 lays itself closely against the pre-moulding 81, as represented at 88' in FIG. 3.

Figure 5:
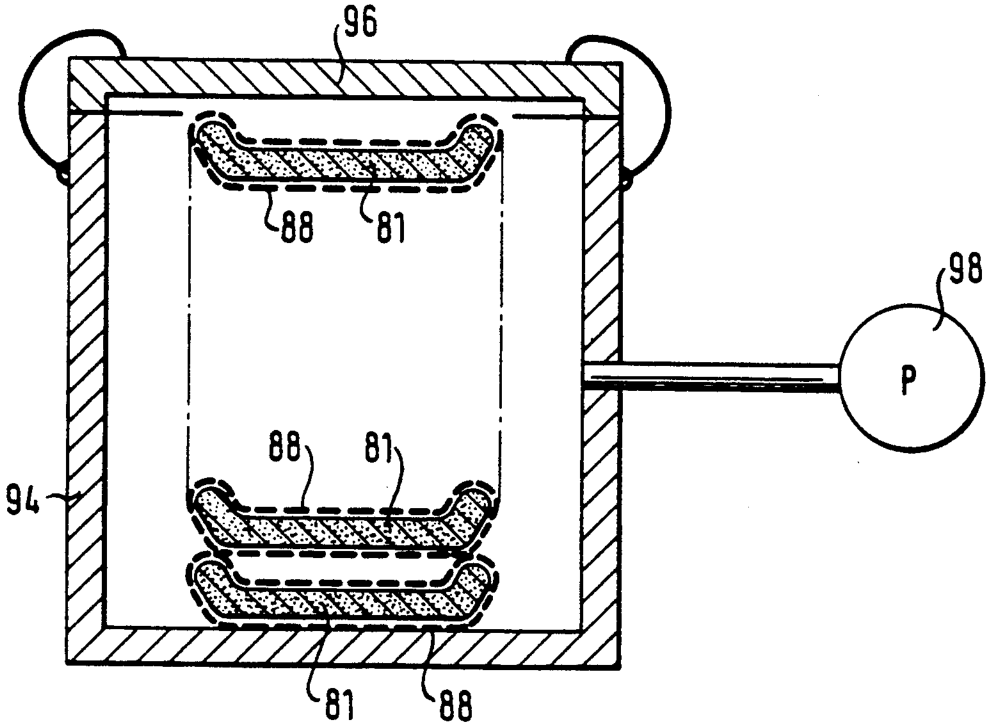
FIG. 5 shows a first form of embodiment of an apparatus for pressing pre-mouldings on all sides.

The pre-moulding thus coated with a protective skin 88' on all sides is now laid into a pressure vessel 94 according to FIG. 5, possibly together with further pre-mouldings. The pressure vessel 94 is closed with a pressure-proof lid 96. Thereupon pressure fluid is pumped into the pressure vessel 94 by means of a pump or a pressure piston 98 and the pressure vessel is set under a pressure of between 350 bars and 1,200 bars. This pressure is maintained for a time of 0.5 seconds. Then the pressure is reduced again, the lid 96 is removed and the mouldings 81 are taken out again. It is ascertained that when a pressure of 1,000 bars is used the diameter of the pre-moulding has reduced by app. 6%.

The moulding is now ready for firing. The foil bag 88 is removed and the moulding is fired in a ONCE-ONLY quick-firing method in a firing kiln of known construction type, namely with a temperature course as illustrated in FIG. 8.

Figure 8:
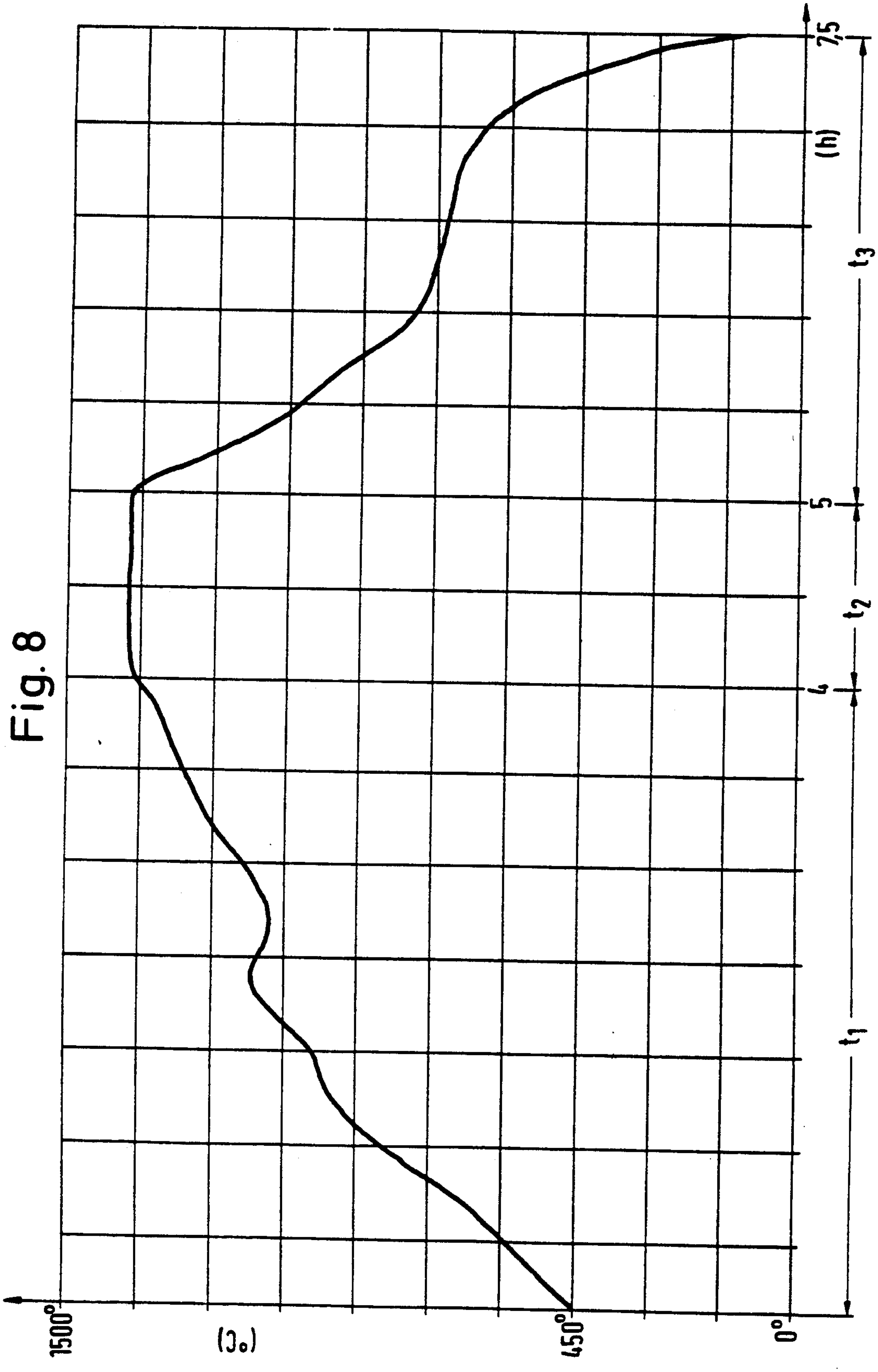

In FIG. 8 the time in hours is entered on the abscissae axis and the temperature in degrees Celsius is entered on the ordinate axis. It may be seen that the total firing duration amounts to about 7½ hours, where firstly during a temperature rise phase t1 of about 4 hours the temperature is raised from about 450° C. to about 1,450° C., during a temperature retention phase t2 of about 1 hour the temperature is kept at about 1,450° C. and during a temperature reduction phase t3 of about 2½ hours the temperature is suddenly cooled from app. 1,450° C. to about 100° C. After termination of the firing time as shown in FIG. 8, the decorated and glazed moulded body is ready for marketing.

Figure 4:
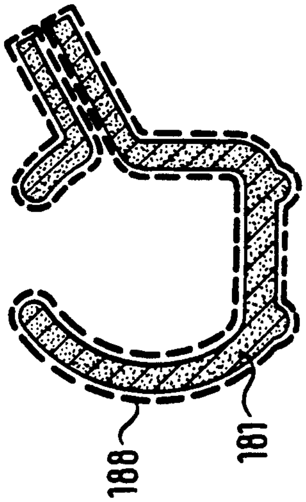
FIG. 4 shows a further form of embodiment of a pre-moulding in a protective skin.

In FIG. 4 there is illustrated an alternative for the development of the protective skin. One sees a pre-moulding 181 of jug type which is completely enclosed by a protective skin 188. The protective skin 188 has been applied by dipping from a film-forming latex and subsequently hardened. If a degassing of the pre-moulding 181 is desired, the application of the protective skin can take place in vacuo.

The pre-moulding 181 is a moulding which ordinarily is produced by the clay casting method in a plaster mould, where after the casting of the pre-moulding in the plaster mould the liquid content of the clay is taken up by the plaster mould at elevated temperature. The pre-moulding 181 from which the plaster mould is removed is stable of form, in the sense of the invention, and can be coated with the protective skin 188. The pre-moulding 181 with the protective skin 188 can be pressed on all sides in the pressure container 94 under a pressure of about 350 bars to 1,200 bars. Then the protective skin is withdrawn, dissolved away or brushed away. The moulding is then ready for firing with a temperature programmed as represented in FIG. 8.

Figure 6:
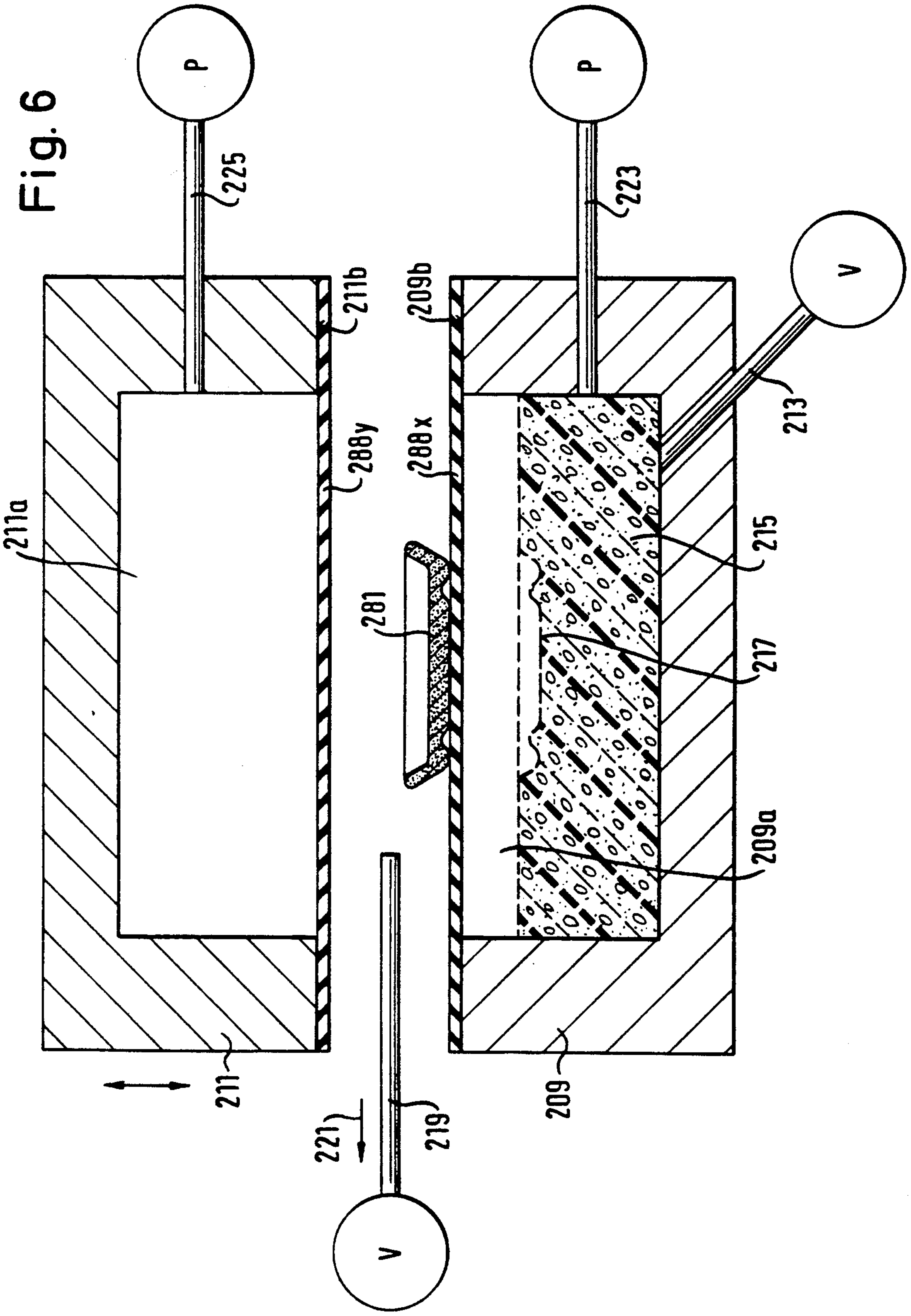
FIG. 6 shows a second form of embodiment of an apparatus for pressing pre-mouldings on all sides.

In the production of flat mouldings (by flat mouldings here there are understood all pre-mouldings which possess no undercut hollows) the pressing on all sides can also be carried out in a manner as represented in FIG. 6 with regard to a plate. The pressing apparatus here comprises a lower press pot 209 and an upper press pot 211, which comprise cavities 209*a* and 211*a*. The cavities 209*a* and 211*a* are covered each by a shaping-neutral elastomer diaphragm 288*x* and 288*y* respectively, which extends in each case over the respective edge surface 209*b* and 211*b*. After removal from the isostatic shaping apparatus the pre-moulding 281 is laid, somewhat according to FIG. 1 and possibly after decorative printing and glazing, between the two diaphragms 288*x* and 288*y*. Here the pre-moulding 281 is set upon the lower diaphragm 288*x*. Before the pre-moulding 281 is set upon the diaphragm 288*x*, the latter can be sucked by a suction device 213 downwards against a support mass 215, so that it is applied against a support face 217 which is shaped in conformity with the pre-moulding profile. Thereafter the upper pressure pot 211 is lowered vertically on to the lower pressure pot 209, so that the two diaphragms 288*x* and 288*y* are clamped in between the edge faces 209*b* and 211*b*. By means of a suction probe 219 here the interspace between the diaphragms 288*x* and 288*y*, which are laid against one another and receive the moulding between them, is sucked empty. The suction probe 219 is thereupon withdrawn in the direction 221 of the arrow. Next the cavities 209*a* and 211*a* are filled through pressure booster conduits 223 and 225 with pressure fluid, especially pressure liquid, and set under pressure. The pressure introduction here takes place in a manner in which the pre-moulding 281, on application of pressure, is kept constantly in a state of suspension and out of contact with the defining faces of the cavities 209*a* and 211*a*. Even contact with the support composition 215 is avoided, at any rate when the support composition consists of a rigid or hard-elastic material. If the support composition 215 consists of a softly-elastic synthetic plastics material, contact with the support composition 215, according to the degree of softness thereof, is harmless. The support composition 215 fulfils also, and possibly only, the function of a volume displacer mass, which ensures that in the pressing operation as small a quantity of fluid as possible must be transported into the cavity 217. Under this consideration the cavity 211*a* could also be filled with a volume displacer mass.

The diaphragms 288*x* and 288*y* consist of a thin rubber or synthetic rubber foil of neutral shaping, which is applied free from folds to the moulding 281, enclosing it on all sides, as soon as the suction probe 219 has sucked the air away. A pressure of about 350 bars to about 1,200 bars is introduced in the cavities 211*a* and 209*a*. This pressure is maintained for a time of 0.5 seconds.

Thereafter the pressure in the cavities 209*a* and 211*a* is eliminated. The pressure pots 209 and 211 are lifted from one another and the moulding 281 is now ready for firing, especially quick firing according to FIG. 8.

It has been ascertained that the pre-moulding 281 in the pressing on all sides according to FIG. 6 experiences a reduction of diameter of 6%, if the pre-moulding has been produced in accordance with the explanation of FIG. 1 and the pressure in the cavities 209*a*, 211*a* is brought to 1,000 bars.

In the subsequent firing according to FIG. 8 a reduction of diameter of 6% occurs.

Examinations of the fired moulded body 281 have shown that this possesses in the strict sense a geometrically similar form to the pre-moulding taken from the press according to FIG. 1, and especially the visible surface has retained its exact profiling and the standing foot has retained its plane standing surface. Downward bulges have not occurred. The glaze is free from pores and free from sealy structure and when considered with the naked eye appears completely evenly smooth. The possibility should not be excluded of the decoration and/or the glaze being applied only after a first firing of the moulding pressed on all sides and then a further firing taking place. It should, however be mentioned again that one especially advantageous effect of the method according to the invention is achieved when the pre-moulding obtained by a first pressing operation from ceramic composition in powder form is first decorated and/or glazed, thereupon subjected to pressing on all sides according to FIGS. 5 or 6, and then fired in a ONCE-ONLY quick-firing method. This combined procedure leads, with minimum production costs, to a moulded body which is optimum as regards structure and appearance.

Figure 7:
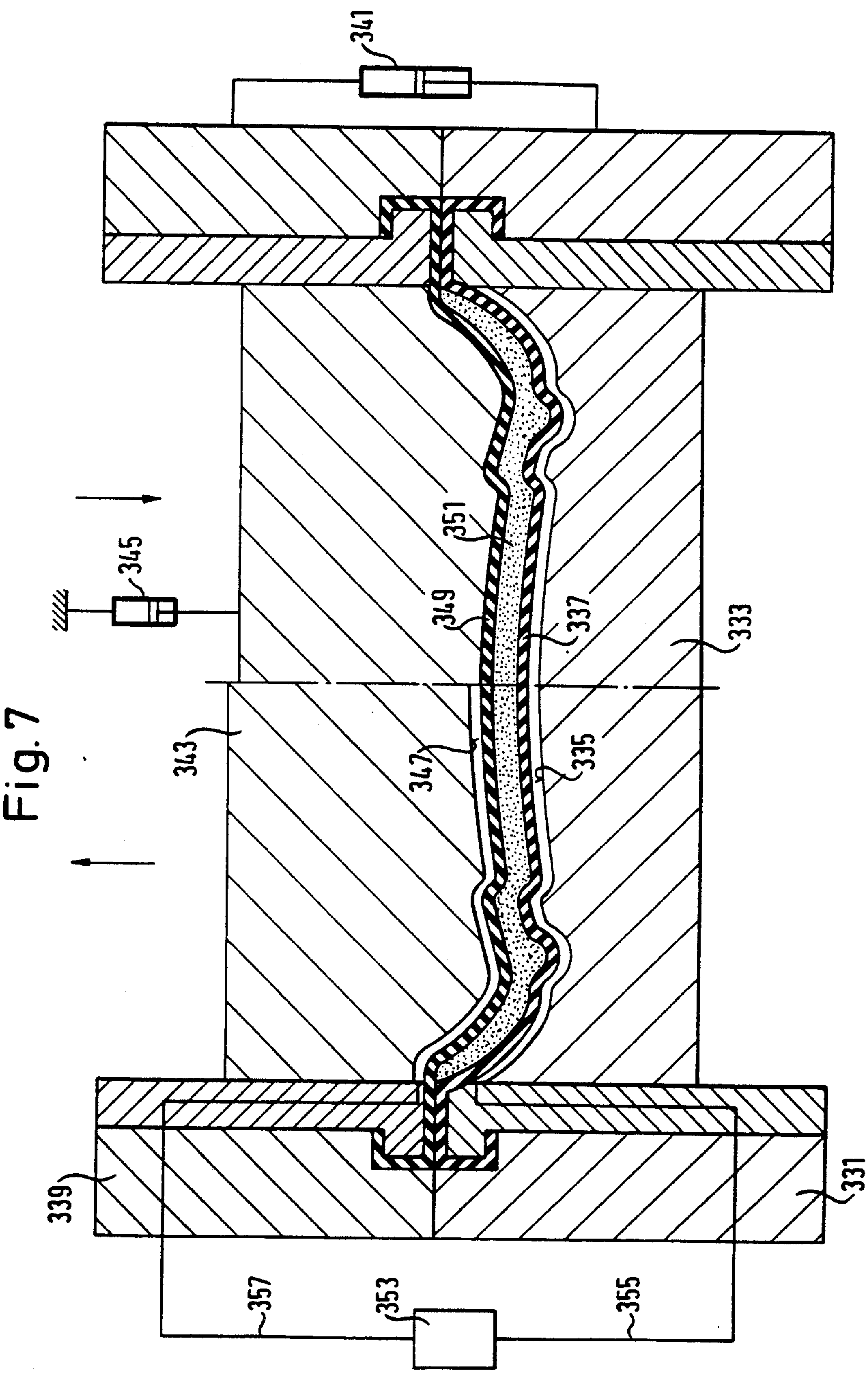
FIG. 7 shows a third form of embodiment of an apparatus which is suitable simultaneously for the isostatic prior pressing and fully isostatic final pressing of the pre-pressed pre-moulding and FIG. 8 shows the temperature course, entered over the time, in the firing of the moulding in a firing kiln.

In FIG. 7 a further apparatus for the production of a moulding is illustrated. This apparatus comprises a lower clamp frame 331 which is firmly connected with a lower mould part 333. The lower mould part 333 comprises a lower, rigid mould face 335. This lower rigid mould face 335 is fitted with a lower diaphragm 337 which is anchored in the lower clamp frame 331. One further sees an upper clamp frame 339 which can be clamped by a clamp press 341 with the lower clamp frame 331. An upper mould 343 is vertically displaceably guided in the upper clamp frame 339 and is vertically adjustable by an adjusting device 345. The upper mould 343 comprises an upper mould face 347 against which an upper diaphragm 349 rests. The upper diaphragm 349 is anchored in the upper clamp frame 339.

If the two diaphragms 337 and 349 rest on the respective mould faces 335 and 347, a cavity 351 is formed between them. In order to fill this cavity, vacuum can be applied through a suction conduit (not shown) and flowable ceramic composition can be filled in through a filling conduit (likewise not shown). During this filling operation the diaphragms 337 and 349 are kept in contact by negative pressure on the rear with the respective diaphragm. When the filling operation of the mould cavity 351 is terminated, firstly pressure is applied through a fluid control apparatus 353 and a conduit 355 to the under side of the lower diaphragm 337, so that the moulding composition, as represented in the right half of FIG. 7, is pressed against the upper diaphragm 349, which is supported rigidly by the upper mould face 347, and thus the pre-moulding is produced, the upper side of which takes over exactly the shaping of the mould face 347. This pre-moulding is then pressed on all sides hydrostatically.

For this purpose the upper mould 343 is lifted slightly by means of the adjusting apparatus 345, for example by 10 mm. Now through the fluid control apparatus 353 and the two conduits 355 and 357 the two diaphragms 337 and 349 are both charged on the rear uniformly with fluid pressure, so that the pre-moulding enclosed by the two diaphragms 337 and 349 as protective skin system is now charged on all sides by the fluid pressure, in suspension between the two mould faces 335 and 347. Thus in this form of embodiment the one diaphragm 337, which acts as isostatic pressure diaphragm in the formation of the pre-moulding can be used at the same time as part of the protective skin during the pressing on all sides. Removal of the pre-moulding from the moulding apparatus which effects its shaping is necessary only in so far as the pre-moulding is distanced from the lower mould face 335 and from the upper mould face 347. Due to the fact that the upper and lower mould faces 335 and 347 are distanced from the moulding, a compression on all sides, but especially in the radial direction, is possible irrespective of the profiling.

Alternatively it is also conceivable to lift the upper mould 343 by the pressure fluid, perhaps as far as a stop; in this case it is possible to dispense with the adjusting apparatus 345.

The method according to the invention and the apparatus according to the invention are suitable especially for the production of thin-shelled workpieces, for example cups, plates and dishes of household and catering establishment tableware, in which a high edge impact strength is especially desired.

We claim:

1. A method for making a ceramic product, comprising shaping a ceramic moulding composition into a moulding of stable form and firing of the moulding, wherein shaping comprises:

a first shaping operation in which the moulding composition is shaped to a pre-moulding of stable form geometrically similar to the moulding, performed in a mould cavity comprising a substantially rigid shaping surface and while the moulding composition, is in shaping contact with the substantially rigid shaping surface; and a second shaping operation in which the pre-moulding is reduced in volume and reshaped into the moulding while enclosed by a protective skin system, performed by pressing with a pressing fluid acting on all sides of the pre-moulding and as the enclosed pre-moulding is substantially out of contact with the substantially rigid shaping surface, the protective skin system having such thickness and flexibility as to have substantially no influence on the reshaping;

the protective skin system being formed by first and second diaphragms, each having a side remote from the moulding composition, and the second shaping operation comprising subjecting the diaphragms to fluid pressure on the respective sides remote from the pre-moulding.

2. The method of claim 1, wherein the first and second diaphragms line the mold cavity and wherein:

prior to the first shaping operation, the moulding composition is introduced into the mould cavity between the diaphragms as the diaphragms are in substantial contact with respective supporting surfaces;

the first shaping operation comprises subjecting the first diaphragm to fluid pressure on its side remote from the mould cavity while the second diaphragm is in substantial contact with its supporting surface.

3. The method of claim 1, wherein, in the second shaping operation, the pressing fluid is pressurized to a pressure of at least 500 bars.

4. The method of claim 3, wherein the pressing fluid is pressurized to a pressure of at least 750 bars.

5. The method of claim 4, wherein the pressing fluid is pressurized to a pressure of at least 1000 bars.

6. The method of claim 5, wherein the pressing fluid is pressurized to a pressure of at least 1200 bars.

7. The method of claim 1, wherein, in the second shaping operation, pressing is effected while the pre-moulding contains water.

8. The method of claim 7, wherein the pre-moulding contains water in the approximate range from 2 to 15 weight percent.

9. The method of claim 8, wherein the pre-moulding contains water in the approximate range from 3.5 to 10 weight percent.

10. The method of claim 1, wherein, in the second shaping operation, pressing is effected while the pre-moulding contains a high-molecular-weight organic binder.

11. The method of claim 10, wherein the organic binder comprises carboxy methyl cellulose.

12. The method of claim 10, wherein the organic binder comprises a liquid synthetic plastics material.

13. The method of claim 1, wherein the protective skin system has an approximately constant skin thickness.

14. The method of claim 1, wherein the moulding composition has powder form.

15. The method of claim 14, wherein the moulding composition is produced by spray drying.

16. The method of claim 14, wherein the pre-moulding is shaped at a pressure which is less than a pressure applied in the second shaping operation.

17. The method of claim 16, wherein the pre-moulding is shaped at a pressure in the approximate range from 100 to 300 bars.

18. The method of claim 1, wherein a space between the protective skin system and the pre-moulding is evacuated.

19. The method of claim 1, wherein the pre-moulding is printed with a decoration.

20. The method of claim 19, wherein printing the decoration is comprised in the first shaping operation.

21. The method of claim 1, further comprising, before the second shaping operation, a step of coating the pre-moulding with a glazing composition.

22. The method of claim 21, wherein coating comprises spraying or dipping.

23. The method of claim 1, wherein firing comprises quick-firing.

24. The method of claim 23, wherein firing is for a time in the approximate range from 6 to 8 hours and comprises:

a first temperature phase having a duration in the approximate range from 3 to 4 hours, during which the pre-moulding is heated from a temperature of approximately 450° C. to a temperature of approximately 1450° C.;

a second temperature phase having a duration of approximately 1 hour, during which the pre-moulding is maintained at a substantially constant temperature of approximately 1450° C.; and a third temperature phase having a duration of approximately 2.5 , hours during which pre-moulding temperature drops from the substantially constant temperature to a temperature of approximately 100° C.

25. The method of claim 1, wherein the protective skin system is formed by applying a coating composition to the pre-moulding.

26. The method of claim 25, wherein the coating composition is applied in vacuo.

27. The method of claim 25, wherein the protective skin system is formed from a thermoplastifiable composition.

28. The method of claim 27, wherein the thermoplastifiable composition comprises wax.

29. The method of claim 25, wherein the protective skin system is formed from a solution or suspension of a film-forming composition, comprising the steps of:

applying a liquid coating of the film-forming composition; and removing a solvent or suspending agent from the liquid coating.

30. The method of claim 25, wherein the protective skin system is formed from a liquid composition hardenable by chemical reaction, comprising the steps of:

applying the liquid composition as a coating; and hardening the coating.

31. The method of claim 1, wherein the pressing fluid is a liquid, and wherein the protective skin system is liquid tight.

32. The method of claim 1, wherein the pressing fluid is a gas, and wherein the protective skin system is gas tight.

33. The method of claim 1, wherein the ceramic product is thin-shelled.

34. The method of claim 33, wherein the ceramic product is a plate, dish or cup.

* * * * *

UNITED STATES PATENT AND TRADEMARK OFFICE

CERTIFICATE OF CORRECTION

PATENT NO. : 5,314,646

DATED : May 24, 1994

INVENTOR(S) : Klaus Strobel and Karl Schwarzmeier

It is certified that error appears in the above-indentified patent and that said Letters Patent is hereby corrected as shown below:

Column 14, line 63, "sealy" should read --scaly--;
Column 16, line 20, ", is" should read --is--.

Signed and Sealed this

Twentieth Day of December, 1994

Attest:

BRUCE LEHMAN

Attesting Officer

Commissioner of Patents and Trademarks